(12) United States Patent
Ogiso

(10) Patent No.: US 12,233,333 B2
(45) Date of Patent: Feb. 25, 2025

(54) INFORMATION PROCESSING SYSTEM, INFORMATION PROCESSING APPARATUS, CONTROL METHOD FOR INFORMATION PROCESSING APPARATUS, AND PROGRAM

(71) Applicant: Sony Interactive Entertainment Inc., Tokyo (JP)

(72) Inventor: Toru Ogiso, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 226 days.

(21) Appl. No.: 17/602,857

(22) PCT Filed: Apr. 14, 2020

(86) PCT No.: PCT/JP2020/016480
§ 371 (c)(1),
(2) Date: Oct. 11, 2021

(87) PCT Pub. No.: WO2020/218094
PCT Pub. Date: Oct. 29, 2020

(65) Prior Publication Data
US 2022/0161128 A1    May 26, 2022

(30) Foreign Application Priority Data
Apr. 26, 2019  (JP) .................. 2019-086343

(51) Int. Cl.
*A63F 13/215*   (2014.01)
*A63F 13/87*    (2014.01)
*G10L 15/20*    (2006.01)

(52) U.S. Cl.
CPC ............ *A63F 13/215* (2014.09); *A63F 13/87* (2014.09); *G10L 15/20* (2013.01)

(58) Field of Classification Search
None
See application file for complete search history.

(56) References Cited

U.S. PATENT DOCUMENTS 9,407,230 B2   8/2016  Kikuchi
9,529,905 B2   12/2016 Kitahara
(Continued)

FOREIGN PATENT DOCUMENTS

CN   101179693 A   5/2008
CN   107431852 A   12/2017
(Continued)

OTHER PUBLICATIONS

Extended European Search Report for related EP Application No. 20794447.1, 11 pages, dated Dec. 22, 2022.
(Continued)

*Primary Examiner* — Nicole A K Schmieder
(74) *Attorney, Agent, or Firm* — Kilpatrick Townsend & Stockton LLP

(57) ABSTRACT

An information processing apparatus is connected to peripheral apparatuses that are to be worn or grasped and used by one or more users. At least one of the peripheral apparatuses includes a device that collects sound of surroundings and outputs a sound signal representative of the collected sound. The information processing apparatus accepts a sound signal outputted from the peripheral apparatus that is worn or grasped by the user, selects at least part of such accepted sound signal or signals on the basis of a predetermined rule, and outputs the selected sound signal or signals while cutting off any other sound signal.

6 Claims, 3 Drawing Sheets

(56) References Cited

U.S. PATENT DOCUMENTS

| | | | |
|---|---|---|---|
| 10,032,461 B2 | 7/2018 | Srinivasan | |
| 10,349,163 B2 | 7/2019 | Asada | |
| 10,425,781 B1* | 9/2019 | Devaraj | H04W 8/186 |
| 11,087,775 B2 | 8/2021 | Kawano | |
| 2003/0118197 A1 | 6/2003 | Nagayasu | |
| 2007/0233905 A1 | 10/2007 | Hatano | |
| 2009/0168984 A1 | 7/2009 | Kreiner | |
| 2011/0111805 A1 | 5/2011 | Paquier | |
| 2012/0185245 A1 | 7/2012 | Kikuchi | |
| 2014/0257541 A1 | 9/2014 | Kitahara | |
| 2015/0163362 A1 | 6/2015 | Dickins | |
| 2015/0249736 A1* | 9/2015 | Johnston | H04M 1/6008 455/418 |
| 2015/0380010 A1 | 12/2015 | Srinivasan | |
| 2017/0103754 A1 | 4/2017 | Higbie | |
| 2017/0318260 A1 | 11/2017 | Torres | |
| 2017/0351476 A1 | 12/2017 | Yoakum | |
| 2018/0115818 A1 | 4/2018 | Asada | |
| 2018/0176713 A1 | 6/2018 | Linsky | |
| 2019/0105114 A1 | 4/2019 | Robbins | |
| 2019/0200175 A1 | 6/2019 | Ylönen | |
| 2020/0321018 A1 | 10/2020 | Kawano | |
| 2021/0195325 A1 | 6/2021 | Edry | |
| 2023/0298587 A1 | 9/2023 | Hignie | |

FOREIGN PATENT DOCUMENTS

| | | |
|---|---|---|
| CN | 108369476 A | 8/2018 |
| EP | 1362623 A2 | 11/2003 |
| EP | 2778900 A1 | 9/2014 |
| EP | 3200552 A1 | 8/2017 |
| JP | 2012147397 A | 8/2012 |
| JP | 2016511594 A | 4/2016 |
| JP | 2017047784 A | 3/2017 |
| WO | 2013069396 A1 | 5/2013 |

OTHER PUBLICATIONS

International Search Report for related PCT Application No. PCT/JP2020/016482, 4 pages, dated Jul. 21, 2020.
Extended European Search Report for corresponding EP Application No. 20795790.3, 10 pages, dated Apr. 17, 2023.
International Search Report for corresponding PCT Application No. PCT/JP2020/016480, 4 pages, dated Jun. 23, 2020.
Office Action for corresponding CN Application No. 202080029786.3, 14 pages, dated Dec. 19, 2023.

* cited by examiner (a)

MIXING SOUND VOLUME   20a : 255    20b : 0    20c : 0

(b)

MIXING SOUND VOLUME   20a : 255    20b : 0    20c : 0
                                               40  : 255

INFORMATION PROCESSING SYSTEM, INFORMATION PROCESSING APPARATUS, CONTROL METHOD FOR INFORMATION PROCESSING APPARATUS, AND PROGRAM

TECHNICAL FIELD

The present invention relates to an information processing system, an information processing apparatus, a control method for an information processing apparatus, and a program.

BACKGROUND ART

In recent years, for controlling by voice or processing of a chat, a plurality of peripheral apparatuses that allow sound inputting are sometimes connected to an information processing apparatus such as a home game machine or a personal computer.

SUMMARY

Technical Problem

However, if voice or the like uttered by a user is processed at a site where a plurality of sound inputting devices exist in such a manner, then the inputted voice sometimes becomes unintended sound due to a difference in timing at which the sound inputting devices collect the same sound or a difference in characteristic of the sound inputting devices.

For example, in a case where several players from among a plurality of players who participate in a game performed through a network gather at one place, such a problem as described below occurs when the players try to perform a chat.

In particular, voice uttered by one of the gathered players is collected not only by a sound inputting device (for example, a microphone) of the uttering player but also by a sound inputting device of a different player who plays at a position adjacent to the relevant player. In this case, simply performing a mixing process for voice of the players causes the voice to become hard-to-hear sound due to muffling of the voice muffled or generation of an echo.

The present invention has been made in view of such a situation as described above, and it is an object of the present invention to provide an information processing system, an information processing apparatus, a control method for an information processing apparatus, and a program by which control of a plurality of sound inputting devices can be implemented by taking such a circumstance as described above into consideration.

Solution to Problem

According to an aspect of the present invention that solves the problem of the prior art described above, there is provided an information processing system that includes peripheral apparatuses that are to be worn or grasped and used by a user and an information processing apparatus. In the information processing system, at least one of the peripheral apparatuses includes sound inputting means for collecting sound of surroundings and outputting a sound signal representative of the collected sound, and the information processing apparatus includes means for accepting a sound signal or signals outputted from at least one of the peripheral apparatuses worn or grasped by the user, selection means for selecting at least part of the accepted sound signal or signals on the basis of a predetermined rule, and means for outputting the sound signal or signals selected by the selection means and cutting off any other sound signal.

Advantageous Effect of Invention

With the present invention, sound becoming hard-to-hear sound due to muffling of voice or generation of an echo can be prevented to thereby implement control of a plurality of sound inputting peripheral apparatuses.

DESCRIPTION OF EMBODIMENT

Figure 1:
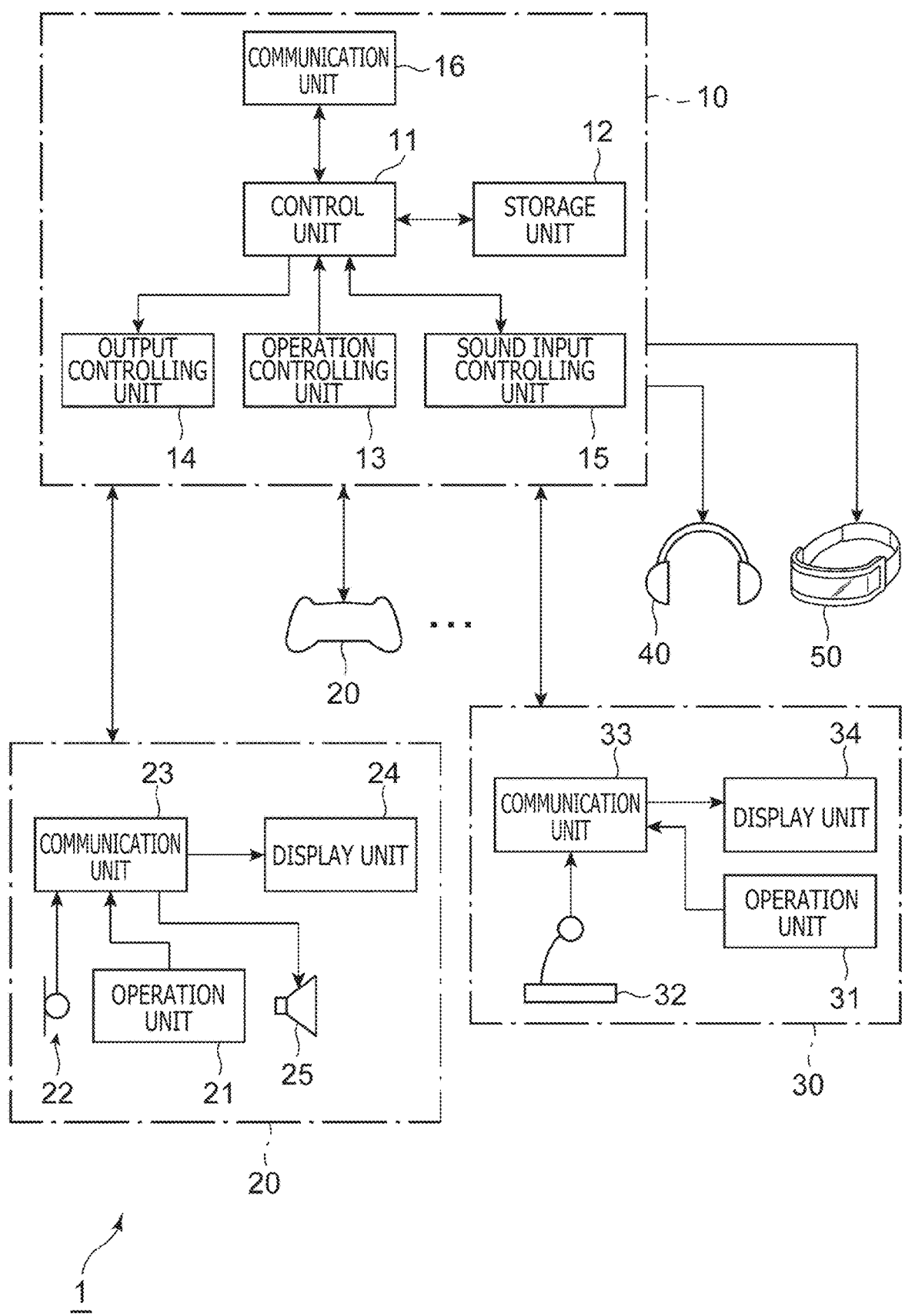
FIG. 1 is a block diagram depicting an example of a configuration of an information processing system according to an embodiment of the present invention.

An embodiment of the present invention is described with reference to the drawings. An information processing system 1 according to the embodiment of the present invention is configured as exemplified in FIG. 1 and includes an information processing apparatus 10 such as a home game machine or a personal computer (PC) and a controller 20. Here, a plurality of controllers 20 may be included. In addition, the information processing system 1 may further include a plurality of peripheral apparatuses each including a sound inputting device, such as a chat controller 30, a headset 40, or a head-mounted display 50, that may be connected to the information processing apparatus 10.

As exemplified in FIG. 1, the information processing apparatus 10 includes a control unit 11, a storage unit 12, an operation controlling unit 13, an output controlling unit 14, a sound input controlling unit 15, and a communication unit 16. Further, the controller 20 includes an operation unit 21, a microphone 22, a communication unit 23, a display unit 24, and a sound outputting unit 25. Further, the chat controller 30 includes an operation unit 31, a microphone 32, a communication unit 33, and a display unit 34.

The control unit 11 of the information processing apparatus 10 is a program-controlled device such as a central processing unit (CPU) and operates in accordance with a program stored in the storage unit 12. In the present embodiment, it is assumed that the control unit 11 executes a plurality of application programs (performs what is generally called a multitasking process) in parallel.

In particular, in a case where the information processing apparatus 10 is a home game machine, the control unit 11 executes various application programs such as an application of a game and a chat application for transferring a sound signal through a network. Further, the control unit 11 executes a system program and executes, as processing of the system program, a process for authenticating a user who uses the relevant apparatus such as the controller 20 or the headset 40 for each apparatus, to associate information for specifying a user (for example, a user name) for each information for specifying the apparatus such as a controller 20 and to store the associated information.

Then, if the control unit 11 accepts input of operation information together with information for specifying the controller 20 from the operation controlling unit 13, then the control unit 11 selects an application that becomes an output destination of the operation information from among applications being executed. It is sufficient if a condition for selecting an output destination here is determined in advance in such a manner that, for example, when a game application is run, the game application is selected in principle and predetermined operation information is processed exceptionally by the system and the selection is performed according to the condition.

The control unit 11 executes, as a process of the application or the system of the output destination of the operation information, a process that uses the information for specifying the controller 20 that is inputted from the operation controlling unit 13 and the operation information. Further, the control unit 11 determines a sound volume of mixing of each sound signal when pieces of sound information individually received from a plurality of apparatus are to be mixed. Operation of the control unit 11 is described later.

The storage unit 12 is a memory device, a hard disk drive, or the like and retains programs to be executed by the control unit 11. Further, the storage unit 12 operates also as a work memory of the control unit 11.

The operation controlling unit 13 is connected for communication by wireless or wired communication to the controller 20, and receives, from the controller 20, operation information representative of the substance of an operation performed by the user with use of the controller 20, to output the received operation information to the control unit 11 together with the information for specifying controller 20 that is a transmission source of the operation information.

Further, in the present embodiment, the operation controlling unit 13 sends out, in accordance with an instruction inputted from the control unit 11, a display controlling signal and so forth to the controller 20 indicated by the instruction.

The output controlling unit 14 is connected to a display device such as a home television set, a monitor, or the head-mounted display 50, and outputs a signal of sound, video, and so forth to the display devices in accordance with an instruction inputted from the control unit 11. Further, the output controlling unit 14 may output video and a sound signal to apparatuses different from each other. For example, the video may be outputted to a monitor, and the sound signal may be outputted to the controller 20 or the headset 40.

Figure 2:
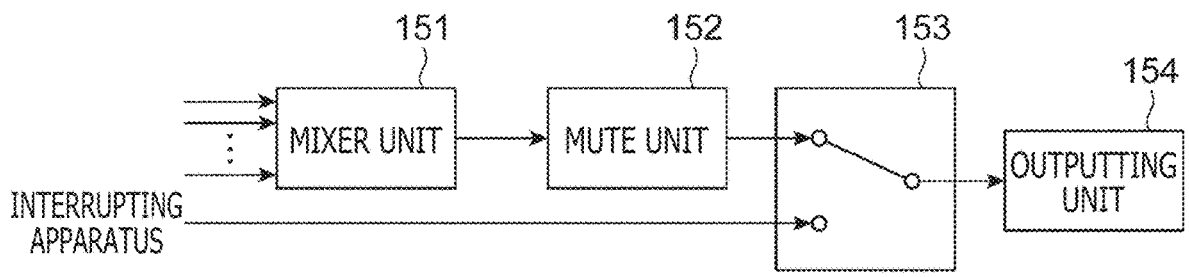
FIG. 2 is a block diagram depicting an example of a configuration of a sound input controlling unit of an information processing apparatus according to the embodiment of the present invention.

The sound input controlling unit 15 receives a sound signal from peripheral apparatuses that include a sound inputting device such as the controller 20, the chat controller 30, the headset 40, and the head-mounted display 50. Further, the sound input controlling unit 15 includes, as exemplified in FIG. 2, a mixer unit 151, a mute unit 152, a switch unit 153, and an outputting unit 154, and synthesizes, by the mixer unit 151, sound signals inputted from an apparatus other than an apparatus determined in advance (for example, other than the chat controller 30) among the sound signals received.

In particular, the mixer unit 151 determines a sound volume for each of sound signals received from the individual apparatuses such as the controller 20, the headset 40, and the head-mounted display 50 and synthesizes the sound signals received from the individual apparatuses with the determined sound volumes. In a certain example of the present embodiment, the mixer unit 151 determines a sound volume of a sound signal received from each apparatus, in accordance with an instruction inputted from the control unit 11.

Further, for example, in a case where the control unit 11 sets the sound volume of the sound signal from the headset 40 to "255" and sets the sound volume of the other sound signals to "0," the mixer unit 151 functions also as selection means. In this example, the mixer unit 151 selectively outputs the sound signal only from the headset 40. Further, in this case, even if there is a sound signal received from the controller 20, the head-mounted display 50, or the like other than the headset 40, such sound signal is not included in the output of the mixer unit 151.

Further, in an example of the present embodiment, a plurality of controllers 20 are possibly connected to the information processing apparatus 10. Alto in this case, the mixer unit 151 determines a sound volume for a sound signal received from each controller 20, in accordance with an instruction inputted from the control unit 11. For example, in a case where an instruction is inputted from the control unit 11 to set the sound volume for a sound signal received from a controller 20a used by a user A to "255" and set the sound volume for sound signals received from controllers 20b and 20c used by the other users B and C to "0," the mixer unit 151 selectively outputs the sound signal received from the controller 20a.

The mute unit 152 switches a sound signal outputted from the mixer unit 151, between outputting as it is or not outputting (muting), in accordance with an instruction inputted from the control unit 11. When the control unit 11 outputs an instruction not to mute, the mute unit 152 outputs the sound signal outputted from the mixer unit 151, as it is. On the other hand, when the control unit 11 outputs an instruction to mute, the mute unit 152 discards (mutes) the sound signal outputted from the mixer unit 151 without outputting the signal to the switch unit 153.

The switch unit 153 accepts input, from among sound signals received by the information processing apparatus 10, of a sound signal from an apparatus that is not inputted to the mixer unit 151 (such sound signal is hereinafter referred to as an interrupting sound signal; in the example here, the sound signal received from the chat controller 30). Further, when the mute unit 152 outputs a sound signal, the switch unit 153 accepts input of the sound signal. The switch unit 153 selectively outputs one of a sound signal (if any) accepted from the mute unit 152 and an interrupting sound signal (if any) in accordance with an instruction inputted from the control unit 11.

The outputting unit 154 outputs the sound signal outputted from the switch unit 153 to the control unit 11. In such a manner, the sound input controlling unit 15 according to the one example of the present embodiment receives sound signals from peripheral apparatuses each including a sound inputting device, mixes the sound signals or selects one of the sound signals, and outputs the resulting sound signal for processing in the control unit 11.

The communication unit 16 is a network interface or the like, and transmits various kinds of information through a network in accordance with an instruction inputted from the control unit 11. Further, the communication unit 16 outputs information received through the network to the control unit 11.

The operation unit 21 of the controller 20 includes buttons, a joystick, and so forth, and accepts an operation of the user, to output operation information representative of the substance of the operation performed by the user to the communication unit 23. Meanwhile, the microphone 22 collects sound of surroundings and outputs a digital sound signal representative of the collected sound.

The communication unit 23 is wireless communication means of, for example, Bluetooth (registered trademark), and outputs information (operation information) representative of the substance of an operation performed on the operation unit 21 by the user to the information processing apparatus 10. Further, the communication unit 23 outputs, to the information processing apparatus 10, the sound signal outputted from the microphone 22. Further, the communication unit 23 outputs, to the display unit 24, a display controlling signal outputted from the information processing apparatus 10. Furthermore, upon receiving a sound signal from the information processing apparatus 10, the communication unit 23 outputs the received sound signal to the sound outputting unit 25.

The display unit 24 includes, for example, a light emitting diode (LED) and so forth. The display unit 24 receives input of a display controlling signal from the communication unit 23 and turns on or off the LED. The sound outputting unit 25 is a device including a vibrator such as a speaker and generates sound on the basis of a sound signal received from the information processing apparatus 10.

Further, the chat controller 30 is what is generally called a push-to-talk device (PTT device) that accepts and outputs input of sound only while the user gives an instruction on sound input, and the operation unit 31 of the chat controller 30 includes, for example, a button. Further, the microphone 32 collects and converts sound of surroundings into a sound signal and outputs the sound signal.

The communication unit 33 is wireless communication means of, for example, Bluetooth (registered trademark) or the like and outputs, while the user is pressing the button of the operation unit 31, a sound signal outputted from the microphone 32, to the information processing apparatus 10. On the other hand, when the user is not pressing the button of the operation unit 31, the communication unit 33 discards the sound signal outputted from the microphone 32 without outputting the sound signal to the information processing apparatus 10. Furthermore, the communication unit 33 outputs, to the display unit 34, the display controlling signal outputted from the information processing apparatus 10.

The display unit 34 includes, for example, an LED and so forth. The display unit 34 receives input of a display controlling signal from the communication unit 33 and turns on or off the LED. Operation of the chat controller 30 is also described later.

The headset 40 includes, for example, a headphone, a microphone, and so forth. The headset 40 causes the speaker to generate sound on the basis of a sound signal outputted from the information processing apparatus 10. Further, the headset 40 sends out a sound signal collected by the microphone to the information processing apparatus 10.

The head-mounted display 50 includes a display, a speaker, and a microphone. The head-mounted display 50 accepts a video signal and a sound signal outputted from the information processing apparatus 10, to display an image on the display and cause the speaker to generate sound. Further, the head-mounted display 50 sends out a sound signal collected by the microphone to the information processing apparatus 10.

Figure 3:
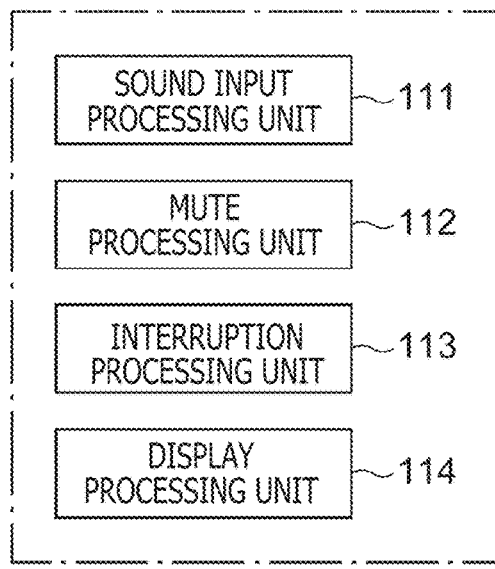
FIG. 3 is a functional block diagram depicting an example of a control unit of the information processing apparatus according to the embodiment of the present invention.

Here, operation of the control unit 11 of the information processing apparatus 10 is described. In the present embodiment, the control unit 11 functionally includes a sound input processing unit 111, a mute processing unit 112, an interruption processing unit 113, and a display processing unit 114 as exemplified as processing of the system in FIG. 3.

It is to be noted that, in the following description of the present embodiment, it is assumed that the control unit 11 determines, in advance, one of apparatuses that are connected to the information processing apparatus 10 and that include a sound inputting device as an interrupting apparatus.

The sound input processing unit 111 performs the following process for target apparatuses that are apparatus including a sound inputting device (in a case where an interrupting apparatus is determined, the interrupting apparatus is excluded from the target apparatus). The sound input processing unit 111 determines a sound volume of mixing for each target apparatus connected to the information processing apparatus 10, in accordance with a predetermined rule. This predetermined rule can be, for example, such as that described in the following. In particular, the control unit 11 determines a priority order for the target apparatuses in advance and sets a sound volume of mixing of a sound signal received from a target apparatus that is highest in the priority order from among the target apparatuses connected thereto to a value that is determined in advance and that is higher than 0 (0 is not included). For this value, for example, the highest value may be set or, for each target apparatus, a different value that is different depending upon the type of the target apparatus may be set; in the following description, the value larger than 0 is referred to as an output value. Further, the sound volume of mixing of a sound signal received from a target apparatus other than the target apparatus highest in the priority order among the apparatuses connected is set to the lowest value. It is sufficient if this lowest value is a value representing, for example, the sound volume "0." This lowest value is hereinafter referred to as a "cutoff value."

It is to be noted that the setting of a rule and a sound volume here is an example, and various other methods may be available. For example, the control unit 11 may set, for a target apparatus selected by the user, a sound volume of mixing of a sound signal received from the selected target apparatus to the output value determined in advance, and set a sound volume of mixing of a sound signal received from any other target apparatus to the cutoff value.

Further, taking a case in which a plurality of users use the information processing apparatus 10 into consideration, the rule may be such as described below. In particular, (1) In principle, one target apparatus is selected for each user;

(2) In a case where the target apparatus selected for each user is a target apparatus determined in advance as an apparatus including a sound inputting device that is less likely to collect sound other than voice of the relevant user, the sound volume of mixing of the relevant target apparatus is set to the output value;

(3) In a case where the target apparatus selected for each user is not a target apparatus determined in advance as an apparatus including a sound inputting device that is less likely to collect sound other than voice of the relevant user (such a target apparatus as just described is referred to as a wide range sound collection apparatus for the convenience of description), one user is selected from among the users whose selected target apparatuses are wide range sound collection apparatuses, and the sound volume of mixing of the target apparatus selected for the selected user is set to the output value; and (4) The sound volume of mixing of the target apparatus whose sound volume in mixing is not set to the output value in (2) and (3) is set to the cutoff value.

According to this example, for a user who uses, as a sound inputting device, the headset 40 or a like device in which the directivity of the microphone is relatively high, a sound signal collected by the headset 40 is enabled to be used in processing as an application. On the other hand, for a user who uses, as a sound inputting device, the controller 20 that is a wide range sound collection apparatus in which the directivity of the microphone is relatively low, only the sound signal collected by the controller 20 operated by one of the users who use the controller 20 as a sound inputting device is enabled to be used in processing as an application.

It is to be noted that, in both cases, when a user who uses a wide range sound collection apparatus operates the controller 20 to issue a request for input of a sound signal, the mixing sound volume of the wide range sound collection apparatus such as the controller 20 of the user is set to the output value, and the mixing sound volume of any other wide range sound collection apparatus is set to the cutoff value.

The mute processing unit 112 outputs an instruction to mute to the sound input controlling unit 15 when it accepts operation information for muting, as operation information received from the controller 20 operated by the user.

The interruption processing unit 113 may output, in accordance with an instruction inputted from an interrupting apparatus determined in advance (for example, an instruction for requesting selection), an instruction to select a sound signal received from the interrupting apparatus to the sound input controlling unit 15. Further, if an instruction to cancel the selection is received from the interrupting apparatus, then the control unit 11 outputs to the sound input controlling unit 15 an instruction to select a sound signal received from any apparatus other than the interrupting apparatus.

The display processing unit 114 outputs, in response to an instruction outputted from the sound input processing unit 111, the mute processing unit 112, and the interruption processing unit 113, a display controlling signal to the apparatus in order to indicate an input state of sound signals. A particular example of this display controlling signal is described later.

[Example of Operation] The information processing system 1 of the present embodiment basically includes such a configuration as described above and operates in the following manner. In the following, an example (FIG. 4(*a*)) in which three users A, B, and C play a game sharing one information processing apparatus 10 will be described.

At this time, it is assumed that the users A, B, and C operate by holding the controllers 20*a*, 20*b*, and 20*c*, respectively. In particular, the information processing apparatus 10 initially authenticates the users who operate the controllers 20 and records, in association with information that specifies the controllers, information specifying the authenticated users. Further, it is assumed that the chat controller 30 as an interrupting apparatus is connected to the information processing apparatus 10.

At this time, it is assumed that the information processing apparatus 10 observes the following rules as the rule determined in advance.

(1) In principle, one target apparatus is selected for each user;
(2) In a case where the target apparatus selected for each user is a target apparatus determined in advance as an apparatus including a sound inputting device that is less likely to collect sound other than voice of the relevant user, the sound volume of mixing of the relevant target apparatus is set to the output value ("255" in FIG. 4);
(3) In a case where the target apparatus selected for each user is not a target apparatus determined in advance as an apparatus including a sound inputting device that is less likely to collect sound other than voice of the user (such a target apparatus as just described is referred to as wide range sound collection apparatus here for the convenience of description), one user is selected from among the users whose selected target apparatuses are wide range sound collection apparatuses, and the sound volume of mixing of the target apparatus selected for the selected user is set to the output value; and
(4) The sound volume of mixing of the target apparatus whose sound volume of mixing is not set to the output value in (2) and (3) is set to the cutoff value.

Thus, the information processing apparatus 10 determines, setting the controllers 20*a*, 20*b*, and 20*c* connected to the information processing apparatus 10 as target apparatuses, a sound volume of mixing for each target apparatus in accordance with the predetermined rule. Here, it is assumed that the controller 20 is a wide range sound collection apparatus. In this example, on the basis of the predetermined rule described above, the information processing apparatus 10 sets, for example, the sound volume of mixing of the controller 20 that is connected first (it is assumed that this is the controller 20*a* of the user A) to the output value and sets the sound volume of mixing of a sound signal outputted from any other target apparatus to the cutoff value.

Thus, in the information processing apparatus 10, a sound signal collected by the controller 20*a* used by the user A and sent out to the information processing apparatus 10 is used in processing of the application.

For example, if the application is a chat application, then the information processing apparatus 10 sends out a sound signal that has been collected by the controller 20*a* and sent out to the information processing apparatus 10 to a chat partner. On the other hand, the information processing apparatus 10 outputs a sound signal received from the partner to an output destination determined by a predetermined method (for example, the controllers 20*a*, 20*b*, and 20*c* here).

At this time, sound signals sent out from the controllers 20*b* and 20*c* are discarded by operation of the sound input controlling unit 15 of the information processing apparatus 10. Consequently, sound collected by the controllers 20*a*, 20*b*, and 20*c* is prevented from being mixed, avoiding muffling of voice or generation of an echo.

Figure 4:
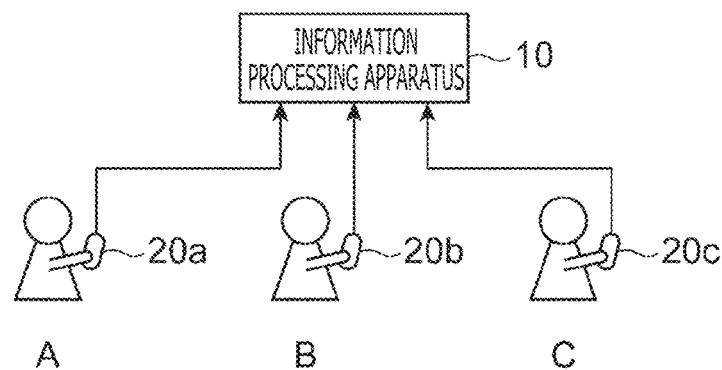
FIG. 4 depicts explanatory views depicting an example of operation of the information processing system according to the embodiment of the present invention.
Figure 4:
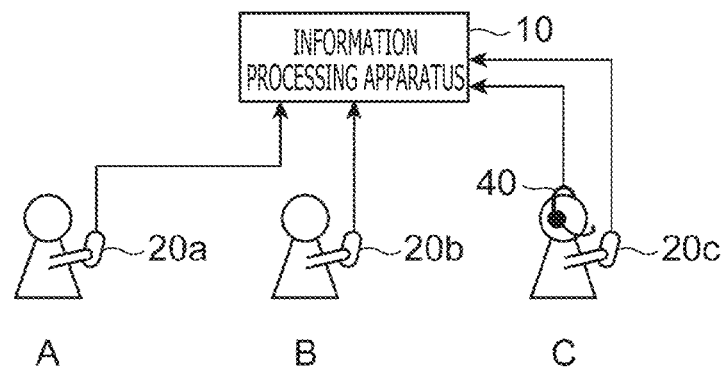

Further, if the user C here wears the headset 40 and is authenticated as a user of the headset 40 by the information processing apparatus 10 (FIG. 4(*b*)), then, using the authentication of the new apparatus as a trigger, the information processing apparatus 10 again sets the controllers 20*a*, 20*b*, and 20*c* connected to the information processing apparatus 10 and the headset 40 used by the user C as target apparatuses and determines sound volumes of mixing for each target apparatus, in accordance with the abovementioned rule.

Here, if it is assumed that the headset 40 is not a wide range sound collection apparatus, then the information processing apparatus 10 here determines, first for the user C, the sound volume of mixing of the headset 40 to the output value, on the basis of the predetermined rule described above. On the other hand, for the other users A and B, the information processing apparatus 10 determines, for example, the sound volume of mixing of the controller 20 that is connected first (here, the controller 20*a* of the user A)

to the output value, and determines the sound volume of mixing of sound signals received from any other target apparatus (controller 20*b* of the user B) to the cutoff value.

At this time, voice uttered by the user C is collected by the headset 40. Then, the sound signal collected by the controller 20*a* used by the user A and sent out to the information processing apparatus 10 and the sound signal sent out from the headset 40 are mixed and used in processing of the application.

At this time, the sound signals sent out from the controllers 20*b* and 20*c* are discarded by operation of the sound input controlling unit 15 of the information processing apparatus 10. Consequently, the sound collected by the controllers 20*a*, 20*b*, and 20*c* is prevented from being mixed, avoiding muffling of voice or generation of an echo. It is to be noted that, since the headset 40 has relatively high directivity, the voice of the user A included in the sound signal outputted from the headset 40 is sufficiently small. Thus, even if the sound signal obtained by sound collection by the headset 40 is mixed with the sound signal sent out from the controller 20*a*, the sound signals are prevented from being mixed, avoiding muffling of voice or generation of an echo.

Further, if the user B here operates the controller 20*b* to perform an operation for requesting input of a sound signal, then information representative of the substance of the operation is transmitted to the information processing apparatus 10. The information processing apparatus 10 receives the request, and maintains the sound volume of mixing of the headset 40 to the output value for the user C. Further, the information processing apparatus 10 sets the sound volume of mixing of the controller 20*b* that has requested inputting of a sound signal to the output value and sets the sound volume of mixing of the sound signal received from any other target apparatus (controller 20*a* of the user A) to the cutoff value.

At this time, the sound signals sent out from the controllers 20*a* and 20*c* are discarded by operation of the sound input controlling unit 15 of the information processing apparatus 10. Consequently, the sound collected by the controllers 20*a*, 20*b*, and 20*c* is prevented from being mixed, avoiding muffling of voice or generation of an echo.

Further, the information processing apparatus 10 that performs processing of the chat application outputs a sound signal received from a chat partner to each controller 20 such that sound is generated by the controllers 20.

[Mute] Further, in an example of the present embodiment, if one of the users operates its controller 20 to issue an instruction for mute, then a sound signal from each apparatus (except the interrupting apparatus) that includes a sound inputting device is muted. In short, in the example of the present embodiment, if an instruction for mute is issued from any of the controllers 20 or the like, then every sound input is cut off.

In particular, if one of the users A, B, and C operates the controller 20 operated by the user itself to issue an instruction for mute, then operation information representing that the operation to mute has been performed is sent out to the information processing apparatus 10.

The information processing apparatus 10 accepts the operation information indicating that muting is to be performed from the controller 20 and outputs an instruction to mute to the sound input controlling unit 15. At this time, with whichever sound volume setting the mixer unit 151 of the sound input controlling unit 15 is mixing the sound signals sent out from the individual apparatus, the mute unit 152 performs control in such a manner that the sound signal outputted from the mixer unit 151 is not outputted (is muted).

Consequently, muting is performed generally by one operation of a user, requiring no labor for setting mute for each apparatus and improving the operability for muting.

Further, depending upon the substance of the mute instruction (for example, in a case where a button for the mute instruction is long-pressed or the like), the control unit 11 may perform such control that, as a process of the output controlling unit 14, a sound signal is not outputted (all mute). By this, sound outputting from the television set, headset, and controllers 20 is also stopped.

[Mute on Peripheral Apparatus Side That Includes Sound Inputting Device] Here, in a case where it is possible for a peripheral apparatus side that includes a sound inputting device such as the controller 20 to control whether or not sending out of a sound signal is to be performed, when some user operates its controller 20 to issue a mute instruction, the information processing apparatus 10 may instruct such a peripheral apparatus as described above to stop sending out a sound signal.

[Output Mode] Further, in the present embodiment, the control unit 11 receiving input of a sound signal from the sound input controlling unit 15 normally performs such control that the inputted sound signal can be used by any application being executed by the control unit 11. In the following, an operation mode of the control unit 11 in which it performs such control as just described is referred to as a share mode for the convenience of description. However, in a certain example of the present embodiment, it is sometimes preferable that an inputted sound signal is used only by a specific application.

In particular, a sound signal from the interrupting apparatus (in the example here, from the chat controller 30) may be used only by a specific application.

Further, if a mute state is valid even though an application is demanding sound input, then sound input is disabled. Thus, when a state in which mute can be cancelled is established temporarily in response to a request from the application side, a sound signal inputted in the state in which the mute is temporarily cancelled should be outputted only to the application by which this request has been issued.

Thus, if sound input becomes necessary in processing of one application, the control unit 11 outputs a display indicating that sound input is requested, to a monitor or the like, and temporarily retains information that specifies the application (that may be an application name).

Here, if a user performs a predetermined operation to unmute through its controller 20, then the control unit 11 detects that the operation has been performed and controls the mixer unit 151 of the sound input controlling unit 15 such that the mixing sound volume of the controller 20 for which the operation has been performed is made maximum (for the other controllers 20 and so forth, the mixing sound volume is set to the cutoff value). It is to be noted that, when an unmute operation is performed for a plurality of controllers 20, the mixing sound volume may be set to the maximum only for the controller 20 for which the unmute operation has been performed at an earliest point of time.

Then, the control unit 11 uses a sound signal that has been received from a controller 20 in a period until a user performs a mute operation through its controller 20 subsequently or until after a predetermined period of time elapses, for processing of an application specified by the information temporarily retained previously (temporary unmute). This sound signal is set to be unavailable for any application other than the application specified by the information. The operation mode of the control unit 11 when this setting is performed is referred to as an exclusive mode for the convenience of description.

Control of such an exclusive mode as just described is similar to operation of a widely known operating system for using inputted information in processing of only a specific application, and thus, detailed description is omitted here.

[Display of Mute State and So Forth] Now, an example of a display controlling signal by the display processing unit 114 is described. In an example of the present embodiment, the control unit 11 outputs (1) a display controlling signal for turning off the LED of the display unit 24 in an unmute state,
(2) a display controlling signal for turning on the LED of the display unit 24 in a mute state, and
(3) a display controlling signal for blinking the LED of the display unit 24 in an all mute state, in the individual cases.

According to this, since a display controlling signal representative of a mute/unmute state is outputted from the information processing apparatus 10 and the controller 20 or the like changes the display of the display unit 24 (changes to turning off, turning on, or flickering) according to the display controlling signal to thereby clearly indicate that a mute state is valid, the user can easily recognize whether or not a state in which sound inputting is possible is valid.

Further, in the present embodiment, the control unit 11

(4) may output, to a device whose mixing sound volume is set to the cutoff value, a display controlling signal that blinks the LED of the display unit 24 in a mode in which the blinking can be distinguished from that in the all mute state.

Here, the mode in which the blinking can be distinguished from that in the all mute state may be such that the cycle of blinking is made longer than that in the case of the all mute state. According to this, such a case in which sound input cannot be performed through the controller 20 owned by a user itself as a case in which sound input is being performed by a different person can be indicated clearly.

Further, although the LED of the display unit 24 is controlled here, the display unit 24 may be formed, for example, as a liquid crystal display unit such that the color of the backlight of the liquid crystal display unit or the display substance is changed to notify the user of the state.

REFERENCE SIGNS LIST

1: Information processing system
10: Information processing apparatus
11: Control unit
12: Storage unit
13: Operation controlling unit
14: Output controlling unit
15: Sound input controlling unit
16: Communication unit
20: Controller
21: Operation unit
22: Microphone
23: Communication unit
24: Display unit
25: Sound outputting unit
30: Chat controller
31: Operation unit
32: Microphone
33: Communication unit
34: Display unit
40: Headset
50: Head-mounted display
111: Sound input processing unit
112: Mute processing unit
113: Interruption processing unit
114: Display processing unit
151: Mixer unit
152: Mute unit
153: Switch unit
154: Outputting unit.

The invention claimed is:

1. An information processing apparatus connected to a plurality of headsets or controllers that individually include sound inputting means that collects sound of surroundings and outputs a sound signal representative of the collected sound, the information processing apparatus comprising:
   an accepting unit for accepting a sound signal or signals outputted from at least one headset or controller among the headsets that are to be worn by one or more users or the controllers that are to be grasped by the one or more users;
   a selection unit for selecting at least part of the accepted sound signal or signals on a basis of a predetermined rule; and
   an outputting unit for outputting the sound signal or signals selected by the selection unit and cutting off any other sound signal,
   wherein the selection unit selects, when the at least one headset or the controller used by the one or more users is a headset or a controller determined in advance, the at least one headset or the controller, but selects, from among a second plurality of headsets or controllers that are to be used by the one or more users but are not the headset or the controller determined in advance, one headset or controller of the second plurality of headsets or controllers, and
   wherein the predetermined rule determines a priority order of sound volume of mixing for each headset or controller depending primarily on a sound collection characteristic of a microphone of the at least one headset or the controller, and secondarily on an order of connection of the headset or controller to the information processing device.

2. The information processing apparatus according to claim 1, wherein the information processing apparatus outputs, to any headset or controller whose output sound signal is cut off and that is among the headsets or the controllers that are to be used by the one or more users, a display controlling signal such that the headset or controller whose sound signal is cut off performs display representative of a state in which sound input through the headset or controller is unavailable.

3. The information processing apparatus according to claim 1, wherein the sound signal or sound signals selected by the selection unit and outputted are used in processing of a chat application.

4. An information processing system that includes one or more headsets or controllers that are to be worn or grasped and used by one or more users and an information processing apparatus, wherein
   at least one of the one or more headsets or controllers includes sound inputting means for collecting sound of surroundings and outputting a sound signal representative of the collected sound, the information processing apparatus includes
an accepting unit for accepting a sound signal or signals outputted from the at least one of the headsets or controllers that is worn or grasped by the one or more users,
a selection unit for selecting at least part of the accepted sound signal or signals on a basis of a predetermined rule, and
an outputting unit for outputting the sound signal or signals selected by the selection unit and cutting off any other sound signal, and
the selection unit of the information processing apparatus selects, when the at least one of the headsets or controllers used by the one or more users is a headset or a controller determined in advance, the at least one of the headsets or controllers, but selects, from among a plurality of headsets or controllers that are to be used by the one or more users and are not the headset or the controller determined in advance, one headset or controller of the plurality of headsets or controllers, and
wherein the predetermined rule determines a priority order of sound volume of mixing for each headset or controller depending primarily on a sound collection characteristic of a microphone of the at least one of the headsets or controllers, and secondarily on an order of connection of the headset or controller to the information processing device.

5. A control method for an information processing apparatus connected to a plurality of headsets or controllers that individually include sound inputting means that collects sound of surroundings and outputs a sound signal representative of the collected sound, the method comprising:
accepting a sound signal or signals outputted from at least one of the headsets or controllers that is worn or grasped by a user;
selecting at least part of the accepted sound signal or signals on a basis of a predetermined rule; and
outputting the sound signal or signals selected by the selection unit and cutting off any other sound signal,
wherein the selecting selects, when the at least one of the headsets or the controllers used by the user is a headset or a controller determined in advance, the at least one of the headsets or the controllers used by the user, but selects, from among a plurality of headsets or controllers that are to be used by the user but are not the headset or the controller determined in advance as a headset or controller that is less likely to collect any sound other than that of the user, one headset or controller of the plurality of headsets or controllers,
wherein the predetermined rule determines a priority order of sound volume of mixing for each headset or controller depending primarily on a sound collection characteristic of a microphone of the at least one of the headsets or the controllers used by the user, and secondarily on an order of connection of the headset or controller to the information processing device.

6. A non-transitory, computer readable storage medium containing a computer program, which when executed by an information processing apparatus that is connected to a plurality of headsets or controllers that are to be worn or grasped and used by one or more users and individually include sound inputting means that collects sound of surroundings and outputs a sound signal representative of the collected sound, causes the information processing apparatus to carry out actions, comprising:
accepting a sound signal or signals outputted from at least one of the headsets or controllers that is worn or grasped by the one or more users;
selecting at least part of the accepted sound signal or signals on a basis of a predetermined rule; and
outputting the sound signal or signals selected by a selection means and cutting off any other sound signal,
selecting, when the at least one of the headsets or controllers used by the one or more users is a headset or a controller determined in advance, the at least one headset or controller, but selecting, from among a plurality of headsets or controllers that are to be used by the one or more users but are not the headset or the controller determined in advance, one headset or controller of the plurality of headsets or controllers,
wherein the predetermined rule determines a priority order of sound volume of mixing for each headset or controller depending primarily on a sound collection characteristic of a microphone of the at least one of the headsets or controllers, and secondarily on an order of connection of the headset or controller to the information processing device.

\* \* \* \* \*